US011273415B2

(12) United States Patent
Hager et al.

(10) Patent No.: US 11,273,415 B2
(45) Date of Patent: Mar. 15, 2022

(54) MEMBRANE MODULE AND METHOD OF DETECTING DEPOSITS IN A MEMBRANE MODULE

(71) Applicant: Technische Universität München, Munich (DE)

(72) Inventors: Simon Hager, Augsburg (DE); Karl Glas, Freising (DE); Martin Meinardus, Neu-Ulm (DE); Matthias Albert, Augsburg (DE)

(73) Assignee: TECHNISCHE UNIVERSITÄT MÜNCHEN, Munich (DE)

( * ) Notice: Subject to any disclaimer, the term of this patent is extended or adjusted under 35 U.S.C. 154(b) by 317 days.

(21) Appl. No.: 16/606,812

(22) PCT Filed: Apr. 18, 2018

(86) PCT No.: PCT/EP2018/059847

§ 371 (c)(1), (2) Date: Oct. 21, 2019

(87) PCT Pub. No.: WO2018/192945

PCT Pub. Date: Oct. 25, 2018

(65) Prior Publication Data

US 2020/0376440 A1 Dec. 3, 2020

(30) Foreign Application Priority Data

Apr. 21, 2017 (DE) .................... 10 2017 108 535.1

(51) Int. Cl.
*B01D 65/08* (2006.01)
*B01D 63/10* (2006.01)
(Continued)

(52) U.S. Cl.
CPC ............ *B01D 65/08* (2013.01); *B01D 63/10* (2013.01); *B01D 63/02* (2013.01); *B01D 65/02* (2013.01);
(Continued)

(58) Field of Classification Search
CPC .......... B01D 2313/143; B01D 2313/90; B01D 2319/04; B01D 63/02; B01D 63/10; B01D 65/02; B01D 65/08; B01D 65/10
See application file for complete search history.

(56) References Cited

U.S. PATENT DOCUMENTS 5,425,877 A 6/1995 Knappe
2003/0205520 A1 11/2003 Johnson
(Continued)

FOREIGN PATENT DOCUMENTS

DE 4233952 C1 4/1994
DE 10130716 A1 1/2003
(Continued)

OTHER PUBLICATIONS

International Preliminary Report on Patentability with Written Opinion dated Oct. 22, 2019 for PCT/EP2018/059847 filed Apr. 18, 2018 (English translation).

(Continued)

*Primary Examiner* — Dirk R Bass
(74) *Attorney, Agent, or Firm* — Paul D. Bianco; Gary S. Winer; Fleit Intellectual Property Law

(57) ABSTRACT

A device and a method for detecting deposits in a membrane module which produces a permeate and which comprises at least one permeable or semipermeable membrane layer. At least one polymer optical fiber for detecting deposits on the membrane layer is integrated in the membrane module such that the polymer optical fiber is in contact with at least one membrane layer. A method of detecting deposits in a mem-
(Continued)

brane module producing a permeate and to a membrane module for producing a permeate from a feed stream of a fluid, in particular an aqueous solution, with the membrane module comprising a plurality of adjacently disposed or stacked sheets of a permeable or semipermeable membrane layer and with at least one polymer optical fiber being embedded or integrated in the membrane module, which polymer optical fiber is in contact with at least one sheet of the membrane layer.

15 Claims, 8 Drawing Sheets

(51) Int. Cl.
*B01D 63/02* (2006.01)
*B01D 65/02* (2006.01)

(52) U.S. Cl.
CPC .... *B01D 2313/143* (2013.01); *B01D 2313/90* (2013.01); *B01D 2319/04* (2013.01)

(56) References Cited

U.S. PATENT DOCUMENTS

2008/0084565 A1 4/2008 Zribi et al.
2016/0310903 A1 10/2016 Miller

FOREIGN PATENT DOCUMENTS

| | | | |
|---|---|---|---|
| DE | 102016004573 | A1 | 10/2016 |
| GB | 1290492 | A | 9/1972 |
| JP | 2016-19932 | A | 2/2016 |
| JP | 2016-107235 | A | 6/2016 |
| WO | 2015199669 | A1 | 12/2015 |
| WO | 2017002081 | A1 | 1/2017 |

OTHER PUBLICATIONS

Al-Juboori, R.A.; Yusaf, T.: Biofouling in RO system: Mechanisms, monitoring and controlling. In: Desalination 302, 2012, S. 1-23.—ISSN 0011-9164.
International Search Report dated Aug. 10, 2018 for PCT/EP2018/059847 filed Apr. 18, 2018.
Written Opinion for PCT/EP2018/059847 filed Apr. 18, 2018.
Search Result for German Patent Application No. 10 2017 108 535.1 filed Apr. 21, 2017.
Korean Office Action for Application No. 10-2019-7034309 (dated Dec. 8, 2020) (7 pages).
Japanese Notification of Reasons for Refusal Office Action dated Jan. 5, 2021 for Application No. 2019-557452 (2 pages).

3b
3c
A
3a
3
3b

3c
A 3
8
1
K
F
P

3‘
8
1
3
K
F
P

3

P
K
6b
7
1
1
1
9
8
7
2
8
7
a
b
6a
1
b
a
12
F

Fig. 7B
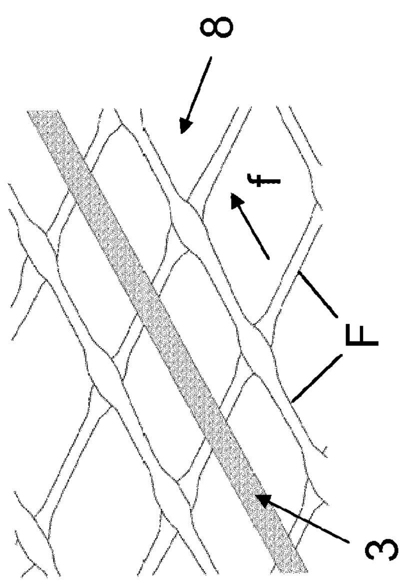
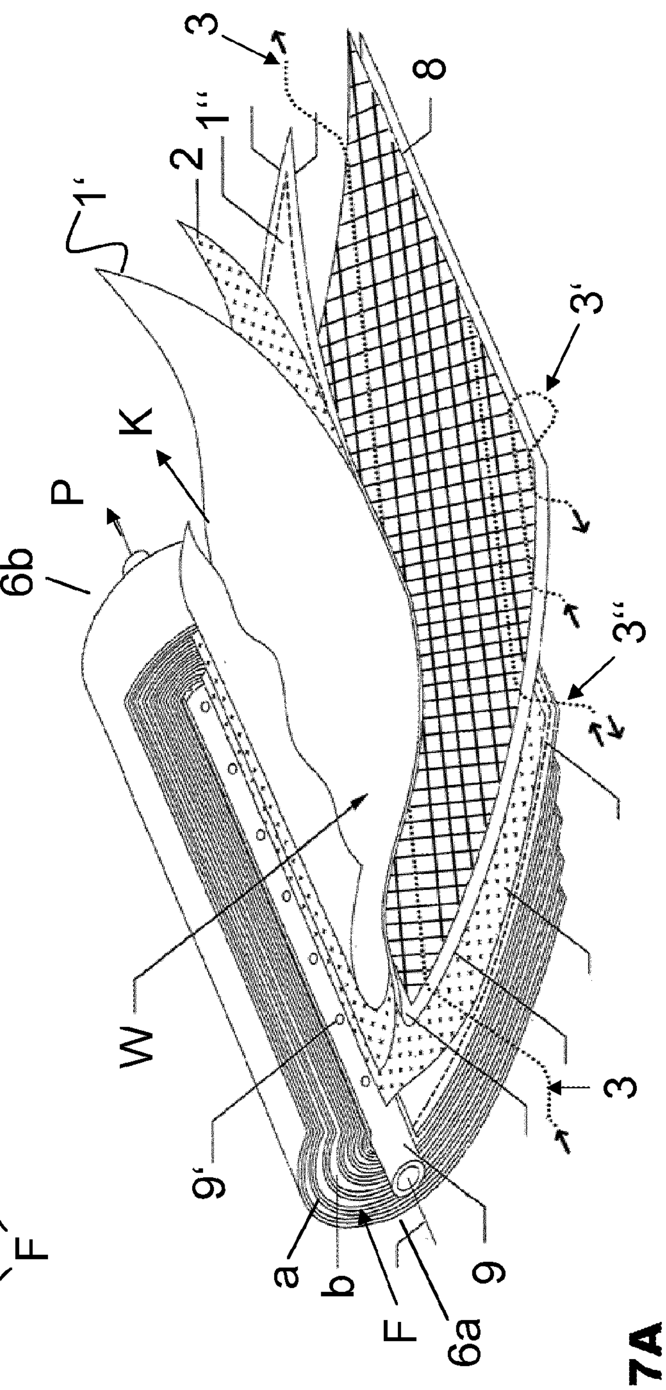
Fig. 7A

MEMBRANE MODULE AND METHOD OF DETECTING DEPOSITS IN A MEMBRANE MODULE

FIELD OF THE INVENTION

The present invention relates to a membrane module comprising a device and a method for detecting deposits in a membrane module which produces a permeate.

BACKGROUND

In membrane separation technology, membrane modules are used to separate a permeate and a retentate from a feed stream of a fluid passing through the membrane module. The retentate is retained by at least one permeable or semipermeable membrane in the membrane module while the permeate permeates through the membrane. This causes low-molecular and high-molecular substances of the feed stream to be separated from each other, with the retentate containing the high-molecular constituents of the feed stream in concentrated form, which is why it is also referred to as concentrate.

As a rule, membrane modules comprise a plurality of sheets of a permeable or semipermeable membrane layer, wherein the sheets may be, for example, flat membrane sheets which, for example, can be stacked one on top of the other to form a plate module or can be spiral-wound around a central vessel to form a spiral-wound module. Disposed between consecutive membrane sheets is an intermediate sheet which serves as a spacer and which allows the permeate and the retentate (also called concentrate) to flow between the membrane sheets. Other configurations of membrane modules are, for example, membrane pocket modules, in which membrane pockets, the edges of which are welded together, are wound around a vessel which has bores, or hollow fiber modules in which hollow membranes are arranged in bundles and affixed on one end by a fixing means, with the hollow fibers being open on the permeate side and being closed on the retentate side.

DE 42 33 952 C1 and DE 101 30 716 A1, for example, disclose spiral-wound modules which can be used for reverse osmosis and for cross flow filtration, in particular for microfiltration. Another spiral-wound module is described in US 2003/0205520 A1. A hollow fiber module is known, for example, from DE 10 2016 004 573 A1.

In membrane systems, membrane modules frequently have a modular configuration and are arranged, in particular, in series- or in parallel-connected circuits, which allows the membrane system to be customized to the volume of the separation process required (for example, the throughput required) and to the material properties of the feed stream and of the permeate and retentate to be produced, in particular, the particle size of the particles that are dissolved in a solution and are to be separated.

Membrane modules are widely used in water treatment processes and filtration processes. Depending on the size of substances to be separated, for example, from an aqueous solution, a distinction is made between microfiltration, ultrafiltration, nanofiltration and reverse osmosis, with the separation process being carried out, for example, by passing a particle-containing solution under pressure through the membrane layers of the membrane modules modularly arranged in a membrane separation system. Since, for example, for reverse osmosis and nanofiltration, high pressures in a range from 3 to 20 bar (nanofiltration) and 10 to 100 bar (reverse osmosis) are required, the membrane layers of a membrane module are disposed in a pressure-resistant housing, for example, a cylindrical pressure vessel. The housing has an inlet for delivering the feed stream and a permeate outlet and a concentrate outlet for discharging the permeate and the concentrate, respectively. In a spiral-wound module, the feed stream, for example, is entered on a face side of the spiral-wound module, and the permeate is collected in a central permeate vessel, which has openings, and discharged through a permeate vessel from the spiral-wound module. The concentrate exits on the opposite face-side end of the spiral-wound module and can be discharged through a concentrate outlet.

When membrane modules are used, in particular, in water treatment and filtration processes, deposits collect on the membrane surfaces, the deposits form a cover layer in which minerals (for example, lime scale), colloidal water constituents and microorganisms in the form of a biofilm accumulate. This cover layer reduces the separation efficiency of the membrane layer, as a result of which regular and, in particular, periodic cleaning and flushing of the membrane modules or a replacement of the membrane layers is required. To clean the membrane layers, for example, surfactant-containing cleaning solutions can be used. To maintain the separation function of the membrane layers intact over long periods of time, it is necessary to clean and flush the membrane layers well enough in advance before clogging of the membrane layers occurs. To ensure timely cleaning and flushing, a cleaning and flushing procedure is generally carried out with a certain time tolerance to prevent the risk of the membrane layers to become clogged. As a result, the membrane modules tend to be cleaned too frequently, which entails, on the one hand, a high consumption of cleaning and flushing fluids and, on the other hand, while the cleaning procedure is being carried out, relatively long down times during which the membrane module is not available for carrying out the separation process. In addition, in spite of regular cleaning of the membrane layers with surfactant-containing cleaning fluids, the growth of microorganisms on the membrane surfaces continues (biofouling). Biofouling also leads to a reduction of the separation efficiency of the membrane modules.

For the purpose of detecting such deposits, US 2008/0084565 A1 proposes the use of an interferometer-based detection system which can also be used in membrane modules for reverse osmosis.

SUMMARY

Taking this state of the art as a starting point, one aspect of the present invention relates to a membrane module and a method of detecting deposits in a permeate-producing membrane module, which allow deposits, for example, in the form of mineral deposits (scaling), deposits of organic molecules or the growth of microorganisms (biofouling), to be detected on the surfaces of the membrane layers contained in the membrane module at any time during the running operation of the membrane module. Another aspect of the invention is to further develop a membrane module comprising a plurality of adjacently disposed or stacked sheets of a permeable or semipermeable membrane layer such that during the running operation of the membrane module in a membrane separation process in which a permeate is produced from a feed stream of a fluid fed to the membrane module, deposits on the surfaces of the membrane layer can be detected. Using the method, it should be possible to reduce the quantity of cleaning and flushing solutions used to regularly clean and flush the conventional membrane modules to a minimum and to reduce the time required for cleaning the membrane modules, during which the membrane modules are not available for use in a membrane separation process. At the same time, it should be possible to evaluate the success of cleaning procedures.

Accordingly, disclosed herein are a membrane module and a method according to the present invention. Preferred embodiments of the membrane module and the method are also disclosed.

According to the present invention, in a membrane module comprising at least one permeable or semipermeable membrane layer, at least one polymer optical fiber is integrated in the membrane module, with the polymer optical fiber being in contact with at least one membrane layer.

The polymer optical fiber favorably comprises a fiber core consisting of a polymer material (for example, PMMA) and a cladding surrounding the fiber core, with the refractive index of the cladding material being lower than the refractive index of the polymer material. In a portion disposed inside the membrane module, the polymer optical fiber preferably has a cut-out in the cladding so that the fiber core in the portion of this cut-out is exposed and is in contact with the surroundings in which the polymer optical fiber is located. The cladding can be designed to have multiple layers and may comprise, for example, an optically effective inner cladding layer, which is disposed adjacent to the fiber core and which has a lower refractive index than the fiber core, and a protective outer cladding. In some cases, it may suffice to simply remove a portion of the protective outer cladding. It is, however, also possible and, for the purpose of increasing the sensitivity, useful to remove both a portion of the optically effective cladding layer and a portion of the protective outer cladding so that the fiber core is exposed in the portion of the cut-outs in which the cladding of the fiber has been (completely) removed.

Inside the membrane module, the polymer optical fiber, which according to the invention is integrated in the membrane module, comes into contact with the fluid that is fed into the membrane module in the form of a feed stream. If, as a result of the passage of the fluid, deposits in the form of minerals, organic molecules or microorganisms form on the surfaces of the membrane layers of the membrane module, the respective constituents of these deposits also precipitate on the surface of the polymer optical fiber and, especially in the portion of the cut-out in the cladding of this fiber, directly on the fiber core. As the deposits accumulate on the surface of the polymer optical fiber and, especially in the portion of the cut-out in the cladding, on the fiber core, the optical parameters of the polymer optical fiber change. More specifically, the transmissivity of the fiber changes since, as a rule, the deposits have a refractive index different from that of the cladding and the core of the polymer optical fiber. For example, if the deposits have a higher refractive index than the core of the polymer optical fiber (as is the case with scaling, for example), the transmissivity is reduced because the light coupled into the fiber exits from the fiber core. If the deposits have a lower refractive index than the core of the polymer optical fiber (as is the case with biofouling, for example), the optical parameters of the fiber also change because of the interactions between the deposits and the evanescent waves produced by the total reflection of the light in the fiber core. The changes in the optical parameters of the polymer optical fiber caused by the deposits can be detected, for example, by coupling one end of the polymer optical fiber to a transmitter for electromagnetic radiation (for example, a light source, especially a laser diode) and the other end of the fiber to a radiation-sensitive receiver (for example, a light-sensitive diode). Using the transmitter and the receiver allows the optical parameters of the polymer optical fiber, especially its transmissivity, which change because of the increasing deposits, to be detected during the running operation of the membrane module without an effect on the membrane separation function. Based on the detected change in the optical parameters, deposits that have formed on the surface of the polymer optical fiber can be quantitatively measured. The greater the quantity of deposits on the polymer optical fiber and thus on the adjacent membrane layer as well, the greater will be the detected change in the optical parameters of the fiber relative to a baseline status. Based on the values measured by means of the polymer optical fiber, it is possible to assess the status of the membrane layers in the membrane module and to determine when cleaning needs to be carried out in order to prevent the membrane layers from becoming clogged. Since the polymer optical fiber in the membrane module is in contact with at least one membrane layer, it can be assumed that the quantity of deposits which accumulates on the surface of the polymer optical fiber is in the same range as the quantity of deposits which accumulates on the surfaces of the membrane layer. Thus, based on the detection of the change in the optical parameters of the polymer optical fiber, it is possible to draw conclusions both with respect to the presence and the quantity of deposits on the surfaces of the membrane layers of the membrane module.

In a membrane system which contains a plurality of membrane modules, the measurement of the deposits need not necessarily be carried out in a module which is used for the actual production of the permeate (membrane separation process). Using a parallel-connected measuring module in which the same membrane separation processes take place, but the output (concentrate and permeate) of which is not used for the actual production, it is possible, for example, to draw conclusions with respect to the presence of deposits in the other membrane modules that are used for the production of a permeate.

The values measured by means of the polymer optical fiber (relative to a change in the optical parameters of the fiber, e.g., its transmission) can be used to assess the status of the membrane module and/or to intervene in the membrane process being carried out in the membrane module. For example, based on the values measured by means of the polymer optical fiber, it can be determined when the membrane layers are at risk of becoming clogged and when cleaning and flushing of the membrane module is indicated to avoid this risk. By changing the process parameters of the membrane separation process, it is possible to reduce any further formation of deposits. During the concentration of a feed stream, it is possible especially for sparingly soluble salts to precipitate in the membrane module. By consecutively varying the concentration while figuring in the values measured by means of the polymer optical fiber, the presence or absence of precipitates can be correlated with a defined concentration. Thus, for example, the membrane separation process can be fine-tuned to obtain a maximum concentration at which no precipitation occurs.

Through an intervention in the membrane separation process, it is, in particular, possible to operate the system with the objective of achieving the highest possible concentration up to the point at which deposits begin to form and/or to optimize the quantity of auxiliary substances (for example, antiscalants or biocides) that are metered in. In addition, a cleaning process can be optimized, for example, by stopping the cleaning process when a predefined measuring signal is received, which indicates that during cleaning, all deposits have been removed to at least the highest possible extent.

In a membrane system with a plurality of membrane modules, an advantage can be achieved by integrating a polymer optical fiber in only one or a few of the membrane modules according to the invention, thereby creating a measuring module for the purpose of detecting deposits on the surfaces of the membrane layers of this measuring module. Based thereon, it can be assumed that the quantity of deposits that accumulate on the membrane layers in the measuring module is in the same range as the quantity of deposits that accumulate in the other membrane modules. Configuring a membrane module as a measuring module also allows the measuring module to be more easily replaced, for example, in the event that the fiber integrated therein becomes defective.

The detection of the deposits preferably takes place in a location of the membrane module in which the local concentration of constituents (for example, salts) that are to be separated during the membrane separation process from the fluid is higher than the concentration of the constituents (in particular, the concentration of salts) that on average are present in the membrane module. Preferred measuring locations used can be, for example, zones of stagnation inside the membrane module, in which zones the fluid entering the membrane module with the feed stream is present for a longer period of time and can therefore lead to an increased formation of deposits.

The preferred measuring locations inside the membrane module are defined, for example, by the creation of cut-outs in the jacket of the polymer optical fiber at the measuring locations selected.

It was found that preferred measuring locations for the detection of biofouling and colloidal fouling are, for example, regions inside the membrane module or inside a membrane system as a whole, which are located in the direction of flow of the fluid at the beginning of the effective area of the membrane module in which the actual membrane separation process takes place. In contrast, it was found that preferred measuring locations for the detection of mineral deposits (scaling) are areas which, in the direction of the entering flow of the feed stream, are disposed at the end of the effective area of the membrane module or a membrane system as a whole.

The membrane module according to the present invention comprises a plurality of adjacently disposed or stacked sheets of a permeable or semipermeable membrane layer, wherein according to the invention, at least one polymer optical fiber is embedded or integrated in the membrane module, said polymer optical fiber being in contact with at least one sheet of the membrane layer.

In useful practical examples, the membrane module can be a flat membrane module or a spiral-wound module, wherein an intermediate sheet is disposed between the adjacently disposed sheets of the membrane layer, and the polymer optical fiber or each polymer optical fiber is embedded or integrated in an intermediate sheet. The intermediate sheets can be, in particular, spacers which space adjacently disposed membrane layers and adjacently disposed sheets of the membrane layer apart from each other and which make the material transport of the feed or retentate and/or permeate in the membrane module possible. The intermediate layers can be formed by woven sheets, braided sheets or latticelike sheets of a network lattice through which the fluid flows. In such intermediate sheets which function as spacers, a polymer optical fiber can be integrated or embedded.

The polymer optical fibers can be favorably integrated in the intermediate sheets which serve as spacers in such a way that specific areas within the intermediate sheets can be reached by the fibers. In addition, the local cut-outs in the cladding of the fiber that surrounds the fiber core can be placed in any location desired within the membrane module. This allows a position-sensitive detection of deposits inside a membrane module to be implemented.

The fiber or each fiber integrated in the membrane module according to the present invention preferably comprises a fiber core and a cladding surrounding this fiber core, with at least one portion of the cladding having a cut-out so that the core is exposed in the portion of the cut-out. The portion with the cut-out is preferably located inside the membrane module, for example, in an intermediate sheet, and is in contact with a membrane layer.

Another possibility is that the portion of the fiber that is located inside a membrane layer is designed without a cladding and that only the portion of the fiber that is located outside the membrane layer is surrounded by a cladding. This reduces the production costs. In that case, the portions of the fiber surrounded by a cladding that are located outside the membrane layers can be located inside the structure of a membrane module since the module with end caps, sheathing, etc., occupies a larger space than the membranes are in contact with.

The membrane module according to the invention preferably comprises a leakproof and, in particular, pressure-resistant housing, for example, in the form of a pressure vessel made of a fiberglass-reinforced plastic, which housing is able to withstand the pressures required during the membrane separation process. The sheets of the semipermeable membrane layers and the intermediate sheets arranged in between are disposed inside the housing, and the polymer optical fiber is routed through the housing. For example, the polymer optical fiber can be routed into the housing through an inlet for the entering feed stream of the fluid and exit through an outlet for the permeate.

The polymer optical fiber or each polymer optical fiber is favorably coupled to a transmitter and a radiation-sensitive receiver, which transmitter and receiver are disposed outside the housing. On one end of the fiber, the transmitter couples electromagnetic radiation (for example, light) into the fiber, and on the other end of the fiber, the receiver measures the intensity of the radiation passing through the fiber core. By comparing the intensity of the coupled-in radiation and the intensity of the radiation transmitted through the fiber and measured by the receiver, the transmissivity of the fiber and, in particular, its change during the running membrane separation operation can be measured.

The values measured by the polymer optical fiber provide a clue about the quantity of deposits that has formed on the surface of the polymer optical fiber and, accordingly, on the surfaces of the membrane layer that is in contact with the polymer optical fiber. The values measured therefore provide information with respect to the formation of deposits that has already taken place and that is still to be expected as the membrane separation process proceeds. Therefore, based on the values measured by the fiber, predictions about the subsequent formation of deposits on the membrane surfaces can be made, and by intervening in the membrane separation process, for example, by changing the external parameters, such as the quantity and rate of throughput of the feed stream and the external pressure or the temperature inside the membrane module, an increase in the quantity of deposits and biofouling can be prevented. As a result, the operating life as well as the overall life of the membrane module can be prolonged, and the yield can be increased. In addition, the resource efficiency of the membrane separation process is improved since the use of cleaning and flushing solutions can be reduced to a minimum or cleaning may even be completely dispensed with. At the same time, after a cleaning step, it is possible to check the success of cleaning procedures not only based on the measurement of the deposits forming during the running separation operation but also based on a detection of deposits that are potentially still present on the surfaces.

BRIEF DESCRIPTION OF THE DRAWINGS

These and additional advantages and features of the invention follow from the practical examples described in greater detail below with reference to the appended drawings. The drawings show:

FIGS. 2A and 2B: Diagrammatic representations of cross sections through polymer optical fibers used in the configuration shown in FIG. 1, wherein FIG. 2A shows a first practical example and FIG. 2B shows a second practical example of a polymer optical fiber;

FIGS. 3A and 3B: A diagrammatic representation of the integration of a polymer optical fiber in a membrane module comprising a membrane layer and an intermediate sheet adjacent thereto, wherein FIG. 3A shows a first practical example and FIG. 3B shows a second practical example of an integration of the polymer optical fiber in an intermediate sheet of the membrane module;

FIGS. 7A and 7B: FIG. 7A is a representation of a third practical example of a membrane module according to the invention in the form of a spiral-wound module, wherein the membrane module, for reasons of clarity, is shown in a partially cut-away view and the integration of the polymer optical fibers in the membrane module is shown in different versions and wherein the insert of FIG. 7B shows an enlarged view of the integration of a polymer optical fiber in the membrane module;

FIG. 1 is a diagram of a configuration for detecting deposits in a membrane module which produces a permeate. The membrane module is designed to serve as a measuring module 12 and comprises at least one permeable or semi-permeable membrane layer (which is not shown in FIG. 1) and at least one polymer optical fiber 3 which is integrated in the membrane module (measuring module 12) such that the polymer optical fiber 3 is in contact with at least one membrane layer. The at least one membrane layer of the measuring module 12 is disposed in a leakproof housing 6. The housing 6 can be, in particular, a pressure vessel which, in keeping with the intended use of the membrane module, is able to withstand the high pressures prevailing in conventional membrane separation processes, such as microfiltration, ultrafiltration, nanofiltration or reverse osmosis.

Figure 1:
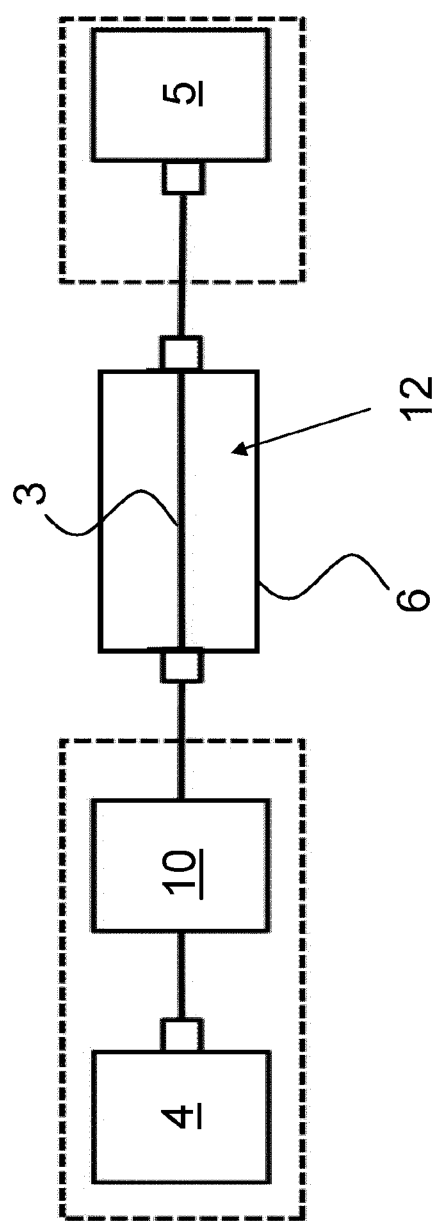
FIG. 1: A diagrammatic representation of a configuration for detecting deposits in a membrane module producing a permeate according to the invention.

On one end of the fiber, the polymer optical fiber 3 which is integrated in the measuring module 12 is coupled to a transmitter and on the other end of the fiber to a receiver. The transmitter 4 can be, for example, a single- or multimode laser- or light-emitting diode (LED) which generates electromagnetic radiation, in particular light in the visible frequency range. When a laser- or light-emitting diode (LED) is used, it is useful, for the purpose of coupling the modes generated by the transmitter 4, to dispose a mode mixer 10 and a fiber coupler between the transmitter 4 and the fiber end of the fiber 3, into which end the electromagnetic radiation is being coupled. The use of a mode mixer 10 makes it possible to distribute the modes coupled in by the transmitter 4 in the most defined and reproducible possible way over short distances. The receiver 5 which is coupled to the other end of the fiber and which is a radiation-sensitive detector (for example, a photodiode) measures the intensity of the radiation conducted through the fiber 3, possibly with spectral resolution.

Figures 2A, 2B:
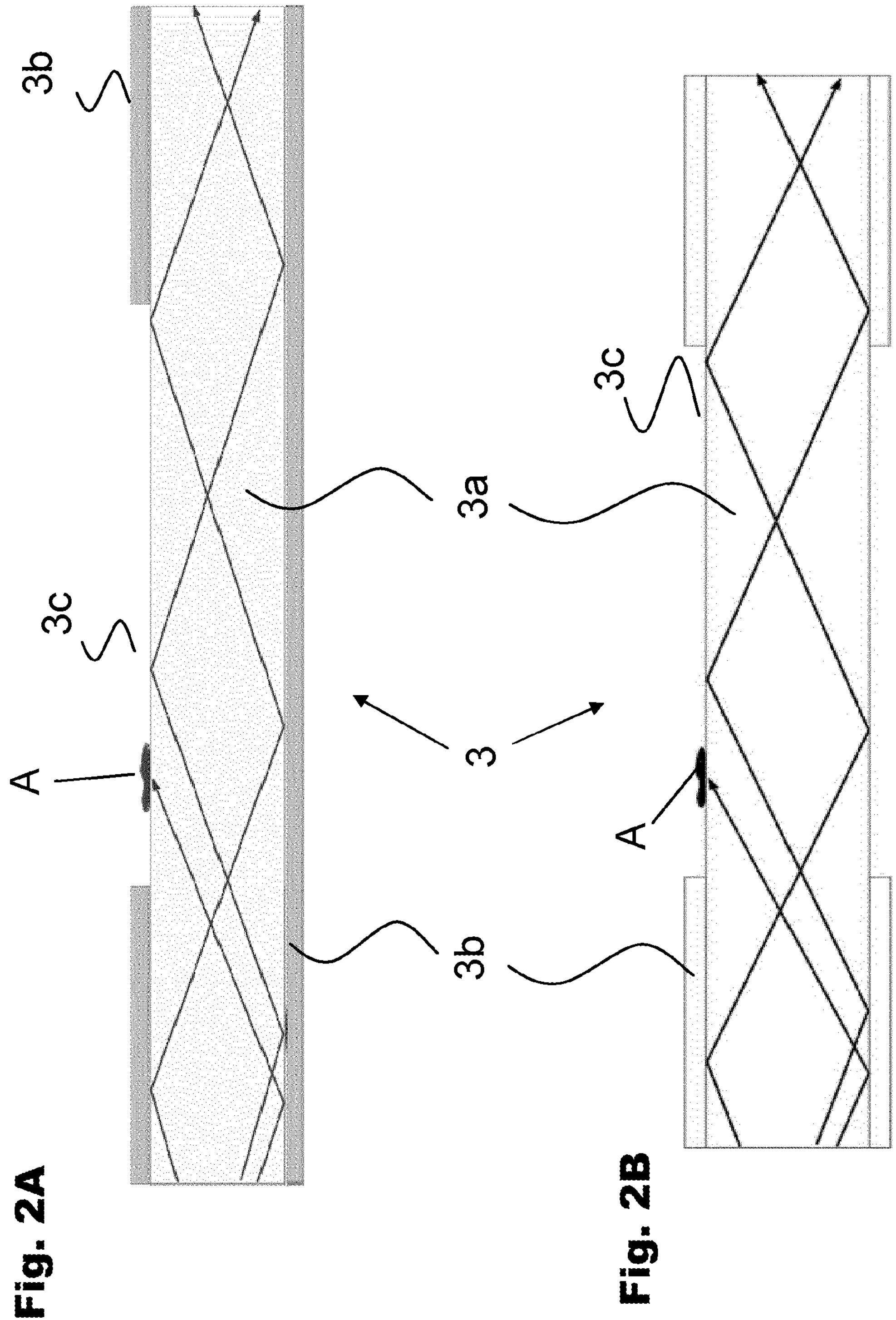

FIGS. 2A and 2B show two practical examples of a polymer optical fiber 3 which can be used in the membrane module according to the invention and in the method according to the invention. In the two practical examples shown in FIG. 2A and in FIG. 2B, the polymer optical fiber 3 comprises a fiber core 3*a* and a cladding 3*b* which surrounds the fiber core, with the fiber core 3*a* having a higher refractive index than the cladding 3*b*. The fiber core 3*a* can be made, for example, of PMMA with a refractive index of n=1.49, and the cladding 3*b* can have a refractive index, for example, of n=1.42. In both practical examples of FIGS. 2A and 2B, a cut-out 3*c* is disposed in a portion of the cladding 3*b* of the fiber 3.

In the practical example of FIG. 2A, the cut-out 3*c* is no more than a dot, i.e., the surface area occupied by the cut-out 3*c* is markedly smaller than the surface area of the cladding 3*b*. In the practical example of FIG. 2B, on the other hand, the cut-out 3*c* is larger and, especially in the area of the cut-out 3*c*, extends over the entire circumference of the cladding 3*b*. In the portion of the cut-out 3*c*, the fiber core 3*a* is exposed and therefore in direct contact with the surrounding area in which the fiber 3 is located.

If the fiber 3 is integrated in a membrane module as disclosed by the invention, the fiber core 3*a* comes into contact with the fluid which, for the purpose of producing a permeate, is passed through the membrane module (measuring module 12 of FIG. 1). If the fluid contains substances, for example, carbonate ions or microorganisms, which can lead to the formation of deposits on the membrane layers of the membrane module, these deposit-forming substances therefore also come into direct contact with the fiber core 3*a*. As a result, deposits A can precipitate on the surface of the fiber core 3*a* which, in the portion of the cut-outs 3*c* of the fiber, is exposed. The deposits A can be, in particular, mineral deposits (for example, lime scaling), deposits of organic molecules or growth of microorganisms (biofouling). As the formation of deposits A on the exposed surface of the fiber core 3*a* increases, the optical parameters of the fiber 3, in particular the transmissivity, change. If deposit A has a higher refractive index than the core of the optical fiber, light exits from the fiber, as is the case with lime scaling, for example. If deposit A has a lower refractive index than the core, the absorption of the light can be detected in the evanescent field of total reflection. At total reflection, the reflected light in the form of an evanescent wave enters the surrounding medium to a depth of a few μm and, depending on the optical property of the fouling material, certain wavelengths are absorbed to a greater degree in the fouling material. With fouling which, e.g., takes on a reddish color, green light is increasingly absorbed in the evanescent field, which reduces the transmissivity of this wavelength. In this case, fouling is detected, for example, because a reduced transmissivity is measured at a specific wavelength. Thus, because of the specific absorption of different types of fouling, it is possible to differentiate different types of deposits.

The change in the optical parameters, in particular the reduction of the transmissivity of the fiber 3, can be detected by the receiver 5. The change in the measured optical parameter of the fiber 3 detected by the receiver 5 is a measure for the quantity of deposits A on the fiber core 3*a* exposed in the portion of the cut-outs 3*c*.

Figure 3A:
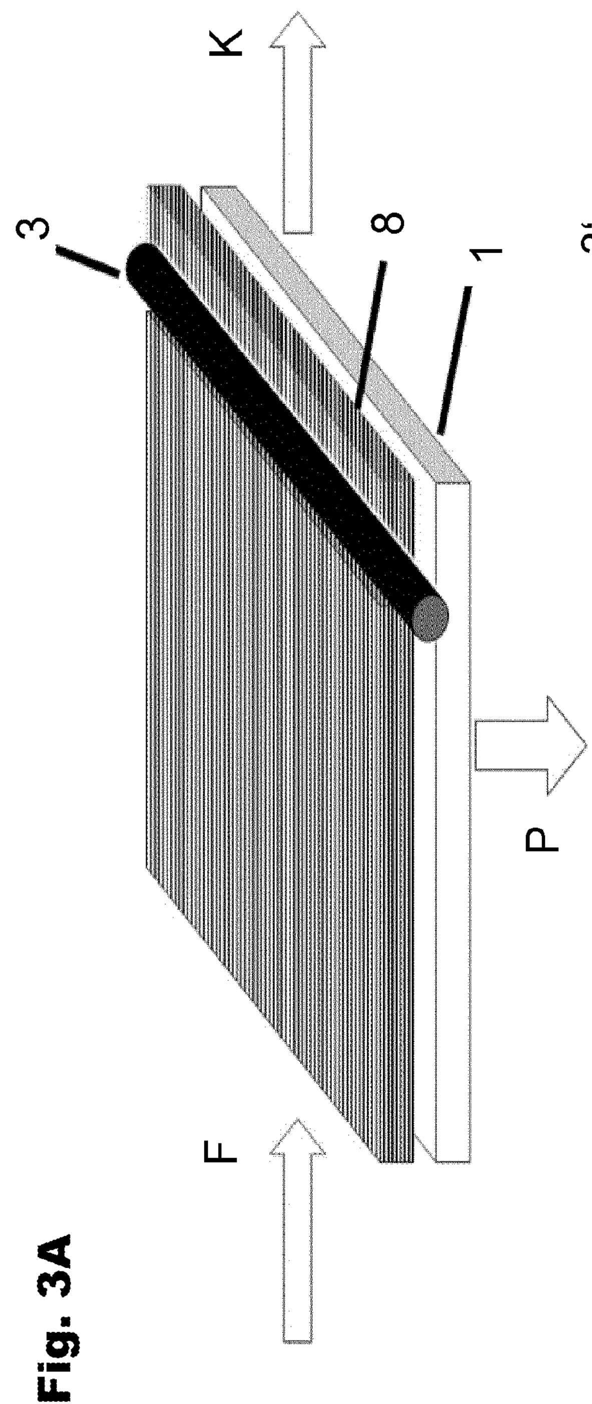
Figure 3B:
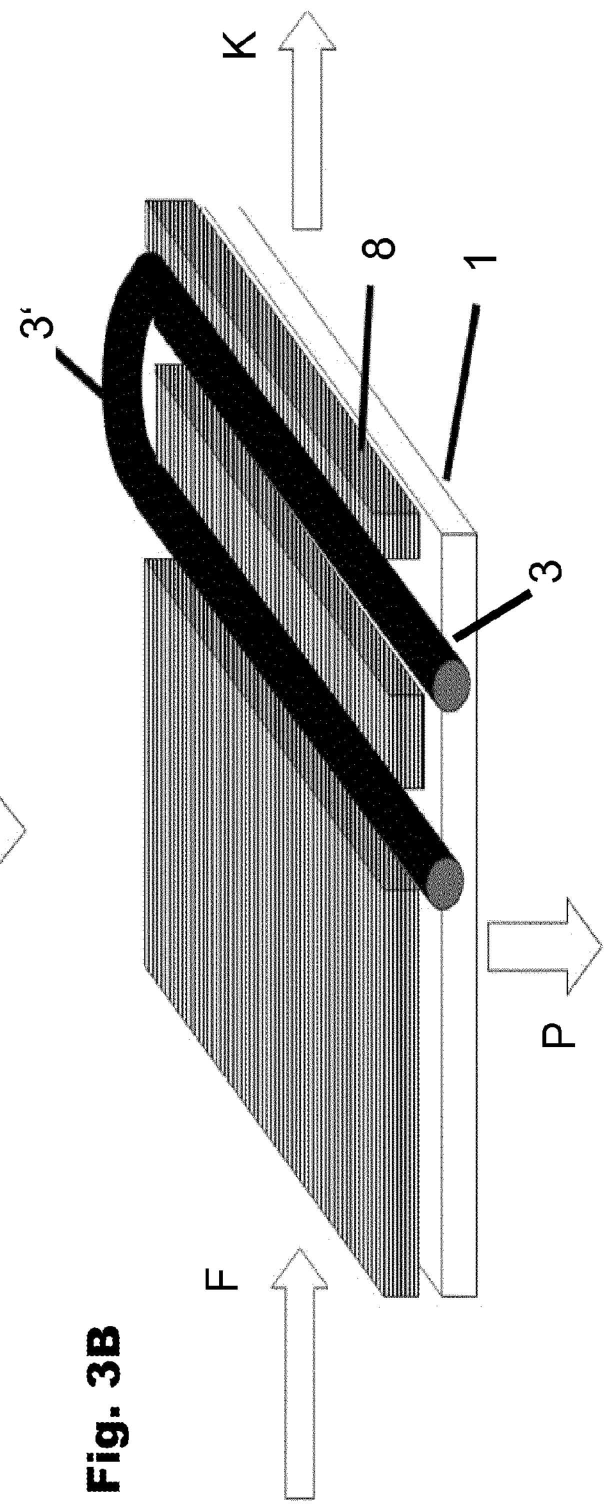

The practical examples of FIGS. 3A and 3B diagrammatically show a possible integration of a polymer optical fiber 3 in a membrane module (measuring module 12). As seen, the membrane module comprises (at least) one permeable or semipermeable membrane layer 1 and an intermediate layer 8. The intermediate layer 8 may be, in particular, a spacer which spaces stacked sheets of membrane layers 1 apart from each other and thereby creates a channel, through which a fluid (for example, water) to be treated in the membrane module can flow.

As FIG. 3A shows, the polymer optical fiber 3 is embedded in the intermediate layer 2, with the fiber 3 extending linearly and parallel to the membrane layer 1. The external surface area of the polymer optical fiber 3 is in contact with a surface of the membrane layer 1.

In the practical example of FIG. 3B, the polymer optical fiber 3 is embedded in the form of a loop in the intermediate layer 2, with the loop comprising a bent portion 3'. Because of the bend of the fiber 3 in portion 3', the optical parameters of the fiber 3 change when compared to those of the fiber in the other portions in which the fiber is embedded in a straight (linear) line. In the practical example of FIG. 3B, it is not necessarily required to provide a cut-out in the cladding 3*b* of the fiber 3 in order to thereby expose the fiber core 3*a* in the portion of the cut-out. In the practical example of FIG. 3B, changes in the optical parameters of the fiber 3 can occur simply as a result of the formation of deposits A in the bent portion 3'. These changes in the optical parameters can be detected by the receiver 5 so that conclusions with respect to the presence and the quantity of deposits A in bent portion 3' of the fiber 3 can be drawn.

Figure 4:
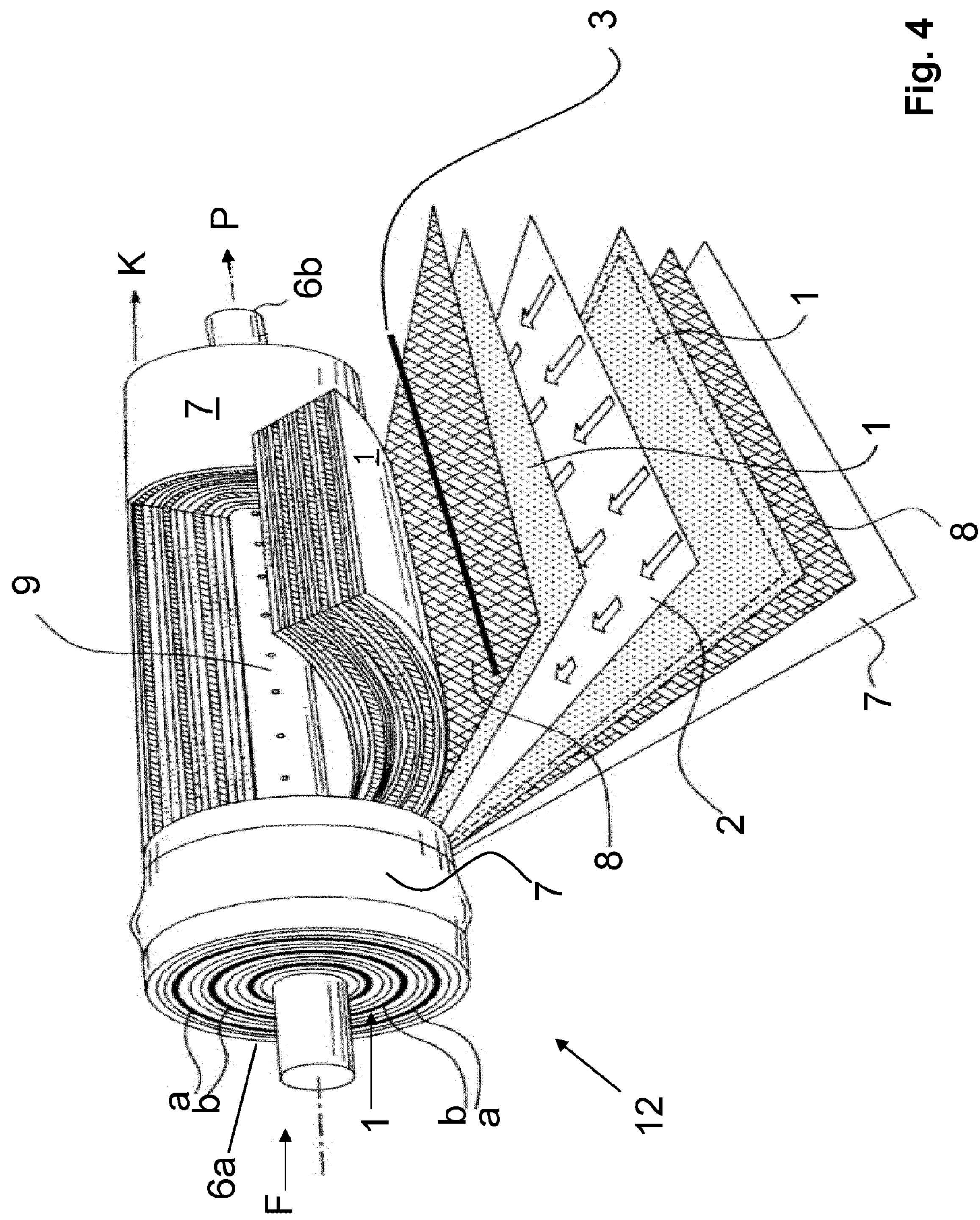
FIG. 4: A representation of a first practical example of a membrane module according to the invention in the form of a spiral-wound module, wherein the membrane module for reasons of clarity is shown in a partially cut-away view.

FIG. 4 shows a first practical example of a membrane module according to the present invention, in which a polymer optical fiber 3 is integrated, with the membrane module being a measuring module 12 in the form of a spiral-wound module.

The measuring module 12 shown in FIG. 4 comprises a cladding 7 in which a permeable or semipermeable membrane layer 1 is disposed. The membrane layer 1 is flat and integrated in a multilayer assembly. The multilayer assembly is spirally wound around a cylindrical central vessel 9. Because the membrane layer 1 is wound around the cylindrical central vessel 9, stacked sheets a, b of the membrane layer 1, as seen when looking in the radial direction, form. The measuring module 12, possibly together with additional modules, can be disposed in a leakproof housing (not shown in the figure).

The partially cut-away view in FIG. 4 shows the formation of the individual sheets a, b. Each sheet a, b of the multilayer assembly (as seen when looking radially from the outside to the inside) comprises an intermediate sheet serving as a feed spacer 8, a first membrane layer 1 made of a semipermeable material, an intermediate layer serving as a permeate spacer 2, another membrane layer 1 made of a semipermeable material and yet another intermediate layer serving as a feed spacer 8. As FIG. 4 shows, the polymer optical fiber 3 is embedded in this intermediate layer, which serves as a feed spacer 8, and is in contact with the adjacent membrane layer 1.

The measuring module 12 shown in FIG. 4 has an inlet 6*a*, through which a feed stream F of a fluid to be treated, for example, an aqueous solution, is delivered. The flow of the feed stream F is oriented tangentially onto the sheets a, b of the spiral-wound module. In the membrane layers 1 of the membrane module, the entering feed stream F is separated into a permeate P and a concentrate K. The permeate P flows through the intermediate layers 2, which serve as permeate spacers, in the direction of the central vessel 9. The central vessel 9 has openings, through which the permeate flows into the inside of the central vessel 9. As a result, the permeate P produced in the membrane module accumulates inside the central vessel 9 and from there flows to an outlet 6*b*, through which the permeate produced is discharged through a discharge line (not shown in the figure) for its intended use. The concentrate K forming during the membrane separation process flows in an axial direction through the spiral-wound module and is discharged in the form of a concentrate stream K from the face end of the module. The concentrate K exiting from the spiral-wound module can either be collected and discharged for an intended use or it can be disposed of through a disposal line.

Figure 5:
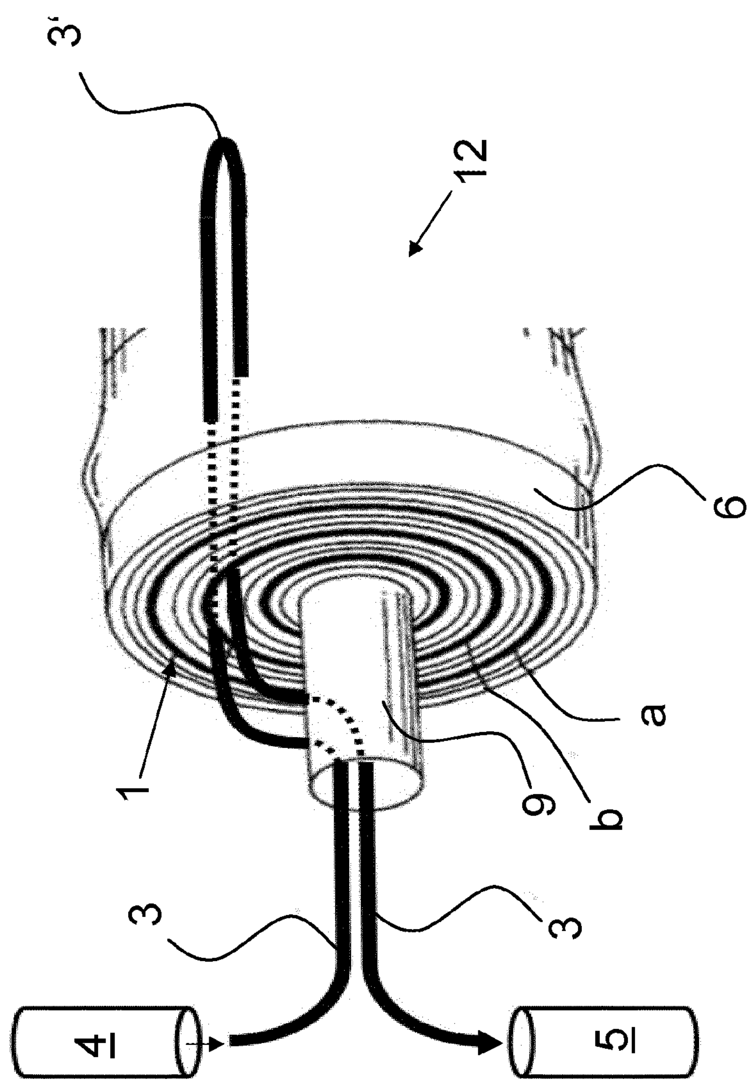
FIG. 5: A detail view of the membrane module in the form of a spiral-wound module, as shown in FIG. 4, in the region of the inlet.

In FIG. 5, the region of the inlet 6*a* of the membrane module 12 of FIG. 4 is shown in greater detail. As FIG. 5 indicates, the polymer optical fiber 3 is routed through the central vessel 9 into the inside of the membrane module 12 and exits on the peripheral surface of the central vessel 9 from the vessel and is integrated in one or a plurality of sheets a, b of the membrane module. As shown in the practical example from FIG. 5, on the end of the membrane module 12, i.e., in the region of the outlet 6*b*, the polymer optical fiber follows the shape of a loop, which has a bent portion 3', and is thus returned to the region of the inlet 6*a*. There, the fiber 3 is routed from the periphery of the central vessel 9 into the inside of the central vessel and from there exits from the membrane module 12. As the diagram of FIG. 5 shows, one fiber end of the fiber 3 is coupled to a transmitter 4, and the other end of the fiber is coupled to a receiver 5. This allows changes in the optical parameters of the fiber 3 resulting from the formation of deposits A on the surface of the fiber 3 to be detected. Based on the detected changes in the measured optical parameters of the fiber 3, conclusions with respect to the presence and the quantity of deposits in the membrane module 12 and, in particular, on the membrane layers 1 can be drawn.

Figure 6:
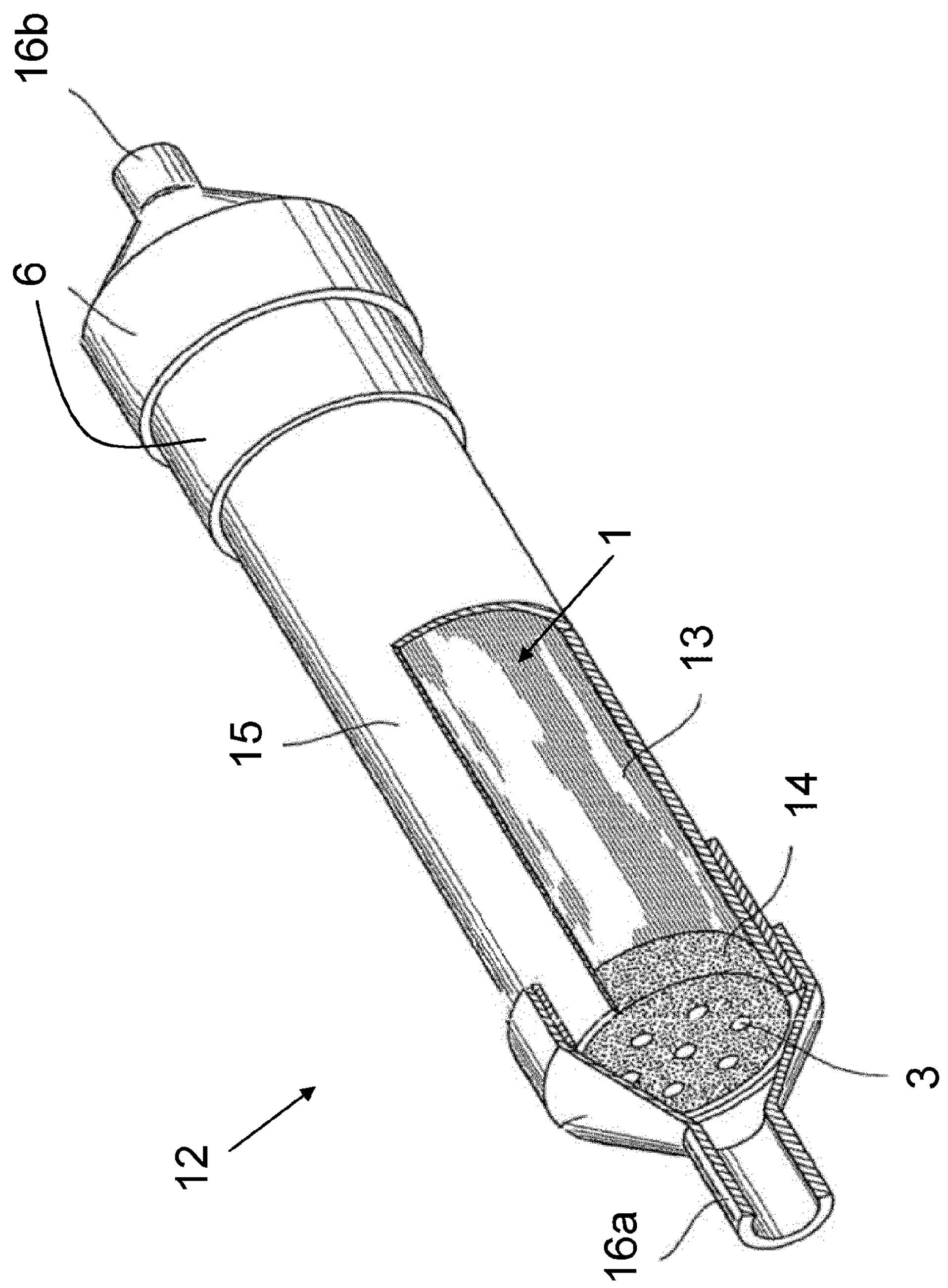
FIG. 6: A representation of a second practical example of a membrane module according to the invention in the form of a hollow fiber module, wherein the hollow fiber module, for reasons of clarity, is shown in a partially cut-away view.

FIG. 6 shows a second practical example of a membrane module according to the present invention with polymer optical fibers 3 integrated therein. The membrane module 12 shown in FIG. 6 is a hollow fiber module. It comprises an external pressure-resistant and leakproof housing 6 and, disposed therein, a cylindrical bundle 13 of hollow fibers which is surrounded by an enclosure 15. On the face sides of the cylindrical bundle 13 of hollow fibers, the ends of the hollow fibers of the bundle 13 are each affixed by means of a fixing means 14. The fixing means 14 may involve, for example, potting of the ends of the hollow fibers with a potting compound. Each hollow fiber of the bundle 13 forms a semipermeable membrane layer 1 and thus, when the hollow fiber module 12 is charged with a fluid to be treated, for example, an aqueous solution, causes the entering feed stream of the fluid to be separated into a permeate P and a concentrate K. For the purpose of introducing the feed stream of the fluid, one end of the housing 6 of the hollow fiber module has an inlet 16*a*. The other end of the hollow fiber module has an outlet 16*b*, through which the permeate P produced is discharged.

As FIG. 6 shows, a plurality of polymer optical fibers 3 are integrated in the bundle 13 of the hollow fibers, with the polymer optical fibers 3 extending parallel to the hollow fibers of the bundle 13 and being in contact with the peripheral surfaces of the respective adjacent hollow fibers. Thus, each of the integrated polymer optical fibers 3 is simultaneously in contact with a plurality of hollow fibers of the bundle 13. For example, on one end of the fiber, each polymer optical fiber is coupled to a transmitter 4 and on the other end to a receiver 5, thereby allowing the optical parameters of each polymer optical fiber 3, especially its transmissivity, to be detected. Thus, as is the case with the spiral-wound module of FIGS. 4 and 5, when a change in the optical parameters of the polymer optical fibers 3 is detected, it is possible with the hollow fiber module of FIG. 6 to draw conclusions with respect to the presence and the quantity of deposits on the outside surfaces of the hollow fibers. Using a plurality of polymer optical fibers 3, a position-selective detection (in the radial direction of the hollow fiber module) of deposits is possible, and it can be determined in which locations of the hollow fiber module an especially large quantity of deposits is present.

FIG. 7A shows a third practical example of a membrane module according to the present invention in which a plurality of polymer optical fibers 3, 3', 3" are integrated, with the membrane module being a spiral-wound module.

The membrane module shown in FIG. 7A comprises a cylindrical central vessel 9 with openings 9', which vessel serves to discharge the permeate produced. Wound around a central vessel 9 is at least one spiral-wound element W (or possibly a plurality of spiral-wound elements) composed of multiple sheets, which spiral-wound element comprises a first and a second membrane layer 1', 1", with an intermediate layer 2 (permeate spacer) disposed in between, and a spacer layer 8 (feed spacer). The rectangular spiral-wound element W is wound around the central vessel 9. As the spiral-wound element W is wound around the cylindrical central vessel 9, sheets a, b of the spiral-wound element W are formed, which, as seen when looking in the radial direction, are lying one on top of the other, each separated by a spacer layer 8 and thereby spaced apart from each other. The spacer layer 8 serves as a feed layer for a feed stream F of a fluid and, to this end, is connected to the two face-side ends of the membrane module so that the feed stream F can be entered on a face-side end and axially along the longitudinal axis of the central vessel. The spacer layer 8 can have a latticelike or reticular structure and be made of a plastic netting or a latticelike nonwoven material and comprises filaments F disposed crosswise relative to each other which extend along and at right angles to a filament direction f, thereby forming a latticelike network, as shown in the enlarged diagram of FIG. 7B. Extending parallel to the filament direction f, a polymer optical fiber 3 is integrated in the spacer layer 8, as seen in FIG. 7B. The polymer optical fiber 3 can lie on top of the filaments of the spacer layer 8, it can be connected (for example, adhesively bonded) to these filaments, or it can be braided into the latticelike network of the spacer layer 8 generated by the filaments F.

FIG. 7A shows a number of ways in which a polymer optical fiber 3 can be integrated in the latticelike network of the spacer layer 8. A first polymer optical fiber 3 extends parallel to a filament direction f of the filaments F of the spacer layer 8 and from one face-side end (inlet 6*a*) to the oppositely lying face-side end (outlet 6*b*) of the membrane module. Winding the spiral-wound element W around the central vessel 9 causes the polymer optical fiber 3 to follow a spiral-shaped path around the central vessel 9. In the practical example of FIG. 7A, a second polymer optical fiber 3' is integrated in the spacer layer 8 such that on a first face-side end (inlet 6*a*), a first end of the polymer optical fiber 3' is routed into the membrane module and that in the cladding 7, the polymer optical fiber 3' in the form of a loop is routed back into the spacer layer 8, and the other end of the polymer optical fiber 3' is routed out of the membrane module through the first face-side end (inlet 6*a*). In the practical example shown in FIG. 7A, a third polymer optical fiber 3" is integrated in the spacer layer 8 such that on a first face-side end (inlet 6*a*), a first end of the polymer optical fiber 3' is inserted into the membrane module, and the second end of the polymer optical fiber 3" is open and designed, for example, to be reflective and ends on the inside of the spacer layer 8. On the reflected end of the polymer optical fiber 3", the signal is reflected and routed back to the first end of the polymer optical fiber 3" where it is coupled to a receiver 5. The fibers 3, 3', 3" shown in FIG. 7A can be integrated individually, in multiple numbers or by means of combining different ways of integrating the fibers in the membrane module. By specifically integrating one or a plurality of fibers 3 in any spacer layer 8, it is possible to achieve a spatial resolution of the distribution of the deposits. This position-sensitive detection of deposits can be further fine-tuned by locally removing the optical cladding 3*b* in some portions. Since scaling begins at the end of the effective membrane area and near the central vessel, it is possible to ensure an early and targeted detection. Similarly, to detect biofouling at the beginning of the effective membrane area one or a plurality of integrated polymer optical fibers can be used.

As in the practical example of FIG. 4, the membrane module of FIG. 7A also comprises a housing (not shown in the figure) with an inlet 6*a*, through which a feed stream F of a fluid to be treated is delivered. The feed stream F orients the flow tangentially onto the sheets a, b of the spiral-wound element W. In the membrane layers 1', 1" of the membrane module, the entering feed stream F is separated into a permeate P and a concentrate K. The permeate P flows through the openings 9' into the central vessel 9 and from there to an outlet 6*b* where the permeate produced is discharged. The concentrate K forming during the membrane separation process flows in an axial direction through the spiral-wound element W and exits in the form of a concentrate stream K on the face-side end (outlet 6*b*) of the spiral-wound element.

Figure 8:
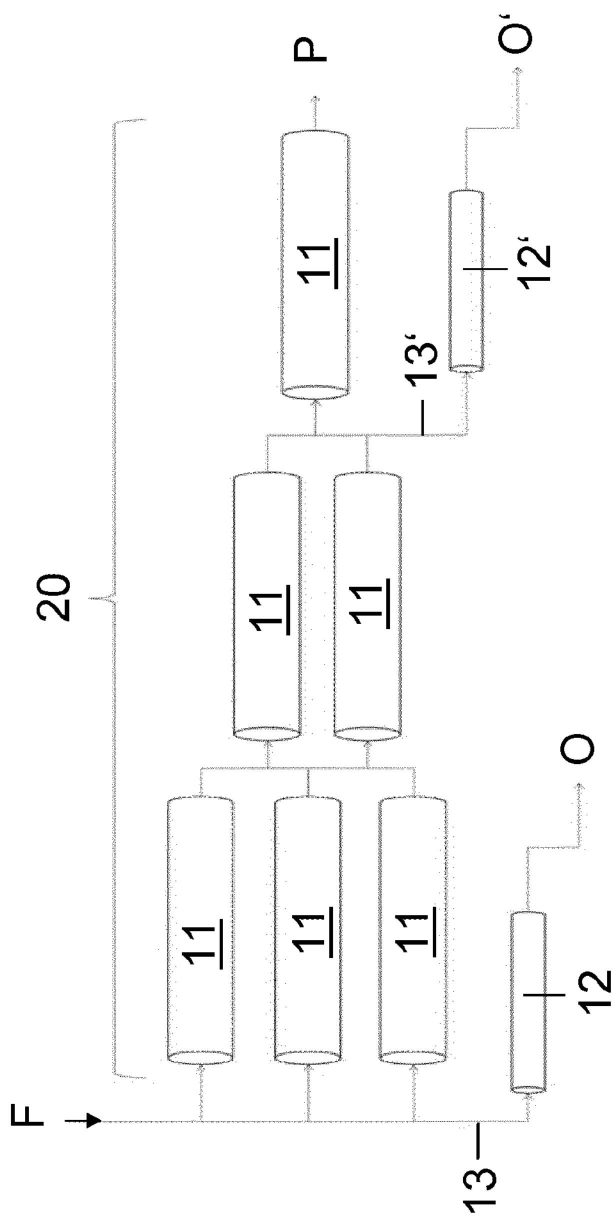
FIG. 8: A diagrammatic representation of a membrane system comprising a plurality of membrane modules, including membrane modules according to the invention which are designed to serve as measuring modules.

The membrane modules described above, which have each at least one polymer optical fiber 3 integrated therein, can be used in membrane systems comprising a plurality of membrane modules for the purpose of detecting deposits in the membrane modules of the membrane system. FIG. 8 shows a diagram of a practical example of such a membrane system 20 with a plurality of from membrane modules 11. Each membrane module 11 serves to produce a permeate from an entering feed stream F of a fluid, in particular an aqueous solution. Each membrane module 11 comprises at least one permeable or semipermeable membrane layer 1. The individual membrane modules 11 can be, for example, spiral-wound modules or hollow fiber modules. As shown in the practical example of FIG. 8, the individual membrane modules 11 can be coupled both in parallel- and in series-connected circuits. The practical example of FIG. 8 shows a "Christmas tree circuit" with a serial arrangement of parallel-connected membrane modules 11. The feed stream F is fed to the membrane system 20 through an inlet, and the permeate P produced in the membrane system by means of membrane separation processes is discharged through an outlet of the membrane system 20.

For the purpose of detecting deposits in the membrane modules 11 of the membrane system 20, this system comprises two membrane modules which, according to the invention, serve as measuring modules 12, 12' as shown in FIG. 8. The membrane modules serving as measuring modules 12, 12' can be, for example, spiral-wound modules, as shown in FIGS. 4 and 7A, or hollow fiber modules, as shown in FIG. 6. Each measuring module 12, 12' comprises at least one permeable or semipermeable membrane layer 1 and at least one polymer optical fiber 3 integrated in the measuring module. For example, in a membrane system 20, one membrane module 11 or a plurality of membrane modules 11 can be replaced with measuring modules 12, 12'. As an alternative, the measuring modules 12, 12' can be integrated in bypass lines 13, 13'. In that case, the measuring modules 12, 12' are arranged in bypass lines 13, 13' of the membrane system 20. The fluid of the feed stream F routed through these bypass lines 13, 13' in that case flows through the measuring modules 12, 12' solely for the purpose of detecting deposits. The output O, O' produced during the membrane separation process in the measuring modules 12 is not fed to the permeate stream P, but is discharged via the bypass lines 13, 13' from the membrane system 20 and disposed of.

A configuration of the measuring modules 12, 12' as shown in the practical example of FIG. 8 makes it possible to specifically select measuring locations in the membrane system 20 which are at risk of the formation of deposits. To detect biofouling, it is preferable to use measuring locations in the region of the inlet of the membrane system 20 in which the feed stream F of the fluid is introduced. To detect mineral deposits (scaling), on the other hand, it was found that measuring locations in the downstream region, i.e., in the region of the outlet of the membrane system 20, are to be preferred.

The invention claimed is:

1. A membrane module which comprises a permeable or semipermeable membrane layer and a device for detecting deposits in the membrane module, wherein a polymer optical fiber is integrated in the membrane module for detecting deposits on the membrane layer, said polymer optical fiber being in contact with the membrane layer.

2. The membrane module of claim 1, wherein the membrane module serves to produce a permeate from a feed stream of a fluid, and wherein the membrane layer comprises a plurality of adjacently disposed or stacked sheets, and the polymer optical fiber is in contact with at least one sheet of the membrane layer.

3. The membrane module of claim 2, wherein an intermediate sheet is arranged between adjacently disposed sheets of the membrane layer, and the polymer optical fiber is embedded or integrated in the intermediate sheet.

4. The membrane module of claim 3, wherein the intermediate sheet serves as a spacer and wherein the polymer optical fiber is integrated in the intermediate sheet.

5. The membrane module of claim 1, wherein the polymer optical fiber comprises a fiber core and a cladding surrounding the fiber core, with the cladding having a cut-out in at least one portion which is in contact with the membrane layer.

6. The membrane module of claim 1, wherein the membrane layer is arranged within a cladding, with the membrane module being disposed in a fluid-proof and pressure-resistant housing.

7. The membrane module of claim 6, wherein the polymer optical fiber is coupled to a transmitter and a receiver, with the transmitter and the receiver being disposed outside the housing.

8. The membrane module of claim 6, wherein the housing has an inlet for a fluid and an outlet for a permeate, wherein the polymer optical fiber is inserted into and exits the housing through the inlet or is inserted through the inlet and exits through the outlet.

9. The membrane module of claim 1, wherein the membrane module has the form of a flat membrane module, a spiral-wound module, a tubular module or a hollow fiber module.

10. A method of detecting deposits in a membrane module by at least one polymer optical fiber, the membrane module producing a permeate and comprising at least one permeable or semipermeable membrane layer, wherein providing at least one polymer optical fiber integrated in the membrane module for in-situ detection of deposits and detecting the deposits during a running membrane separation operation in which the permeate is being produced in the membrane module.

11. The method of claim 10, wherein the at least one polymer optical fiber generates measured values for determining presence and quantity of deposits in the membrane module and wherein the measured values generated by the at least one polymer optical fiber are used to assess the status and/or to intervene in the membrane separation process taking place in the membrane module.

12. The method of claim 11, wherein the membrane separation process is carried out in a membrane system comprising a plurality of membrane modules, with a polymer optical fiber being integrated in at least one of the membrane modules for making the membrane module function as a measuring module in which deposits are being detected in the measuring module by the polymer optical fiber.

13. The method of claim 10, wherein each membrane module is charged with a feed stream of a fluid, with the permeate being produced by the membrane separation process from the feed stream of the fluid in the respective membrane module.

14. The method of claim 13, wherein detecting takes place during the running membrane separation operation at a measuring location in the membrane module, at which measuring location a locally increased concentration of constituents is present in the fluid compared to the average concentration of constituents of the fluid treated in the membrane separation process.

15. The method of claim 13, wherein the fluid is a solution which is passed through the membrane module in a direction of flow, wherein the membrane separation process is carried out in an effective area of the membrane module for separating the solution into the permeate and a concentrate, wherein detection of deposits takes place during the running membrane separation operation at a measuring location in the membrane module located at the end of the effective area of the membrane module for determining a formation of inorganic deposits in the membrane module.

* * * * *